May 6, 1930.  A. DILLOW  1,757,655
CAKE AND PIE PAN
Filed May 7, 1928
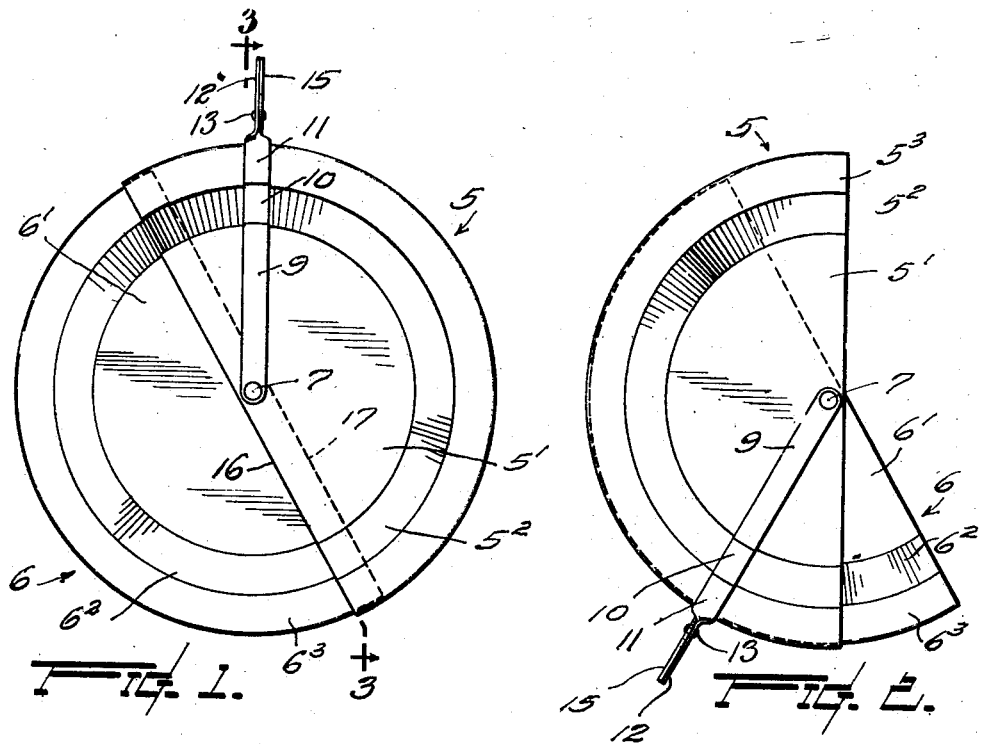
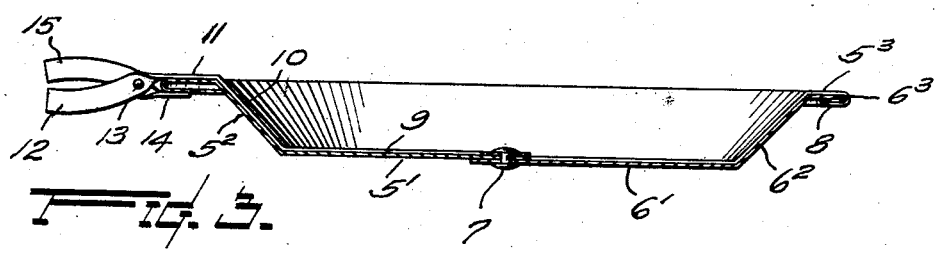
INVENTOR:
Alma Dillow
BY
ATTORNEY Patented May 6, 1930

1,757,655

UNITED STATES PATENT OFFICE

ALMA DILLOW, OF SEATTLE, WASHINGTON

CAKE AND PIE PAN

Application filed May 7, 1928. Serial No. 275,610.

This invention relates to bake pans for pies, cakes, corn bread and the like; and its main object is the provision of a pan of this character from which an article baked therein may be readily removed without marring the article.

More specific objects and advantages of the invention will appear in the following description.

The invention consists in the novel construction, adaptation and combination of parts hereinafter described and claimed.

In the accompanying drawing,—

Figure 1 is a plan view of a pan embodying the present invention showing the parts of the pan body in their relatively closed relation; Fig. 2 is a similar view with said parts in relatively open relation; and Fig. 3 is a detail sectional view taken substantially on the broken line 3—3 of Fig. 1.

According to my invention, the body of the pan is of a circular form comprising duplicate members 5 and 6 each of which is of somewhat greater horizontal area than semicircular to provide overlapping chord edges for the bottom elements $5^1$, $6^1$ and the rim elements $5^2$, $6^2$, of the respective members.

Said members are connected together for relative turning movements at the center of the pan by means of a pivot 7. The pan members 5 and 6 are further connected peripherally of the pan by means of a marginal edge 8 of the flange portion $5^3$ of one member being turned under the flange portion $6^3$ of the other member as shown in Fig. 3. The pivot 7 also serves to connect the pan to the inner end of a blade 9, said blade being arranged radially of the pan, close to the upper surface of the bottom element $5^1$ of one member and thence, as at 10 and 11 over the associated flange $5^3$ to protrude as a handle element 12 outwardly therefrom.

Connected by means of a pivot 13 to said blade handle is a lever, one arm of which extends as a jaw 14 beneath the flange portion of the member 5, the other arm 15 extending outwardly to serve as a finger hold whereby the lever is actuated to cooperate with the blade portion 11 to clamp the handle 12 to the pan member 5 as, for example, when holding the same by one hand to facilitate the relative rotary movements of the member 6 which may be grasped in the other hand of the operator.

The lever 14—15 may also be advantageously employed for clamping the pan to the handle 12 for lifting the pan when hot.

The operation of the invention may be explained as follows: For use, the pan members are arranged—in what I term their closed relation—as represented in Fig. 1 for receiving the raw material for an article to be baked. After baking, the operator turns the members into their relatively open relation with each other about the pivot 7 resulting in the chord edge 16 of the member 5, which overlaps the corresponding edge 17 of the member 6, travelling circuitously upon the latter to separate the baked article therefrom. The article may then be separated from the member 5 by means of the blade 9—11 in an obvious manner. From the foregoing it is apparent that the cutting action of the relatively movable pan members serve to separate but one-half, approximately, of the baked article from the pan, the other one-half of the article being separated by means of the blade, hence the latter is employed cooperatively with the pan itself to entirely separate the article from the pan. The knife blade as a part of the pan organization may, however, be omitted in which case, the article can be released from the member 5 by means of an ordinary kitchen knife or pan-cake turner.

While the pan, per se, may be utilized without an attached knife-blade, it is of advantage to include the latter so as to produce a kitchen utensil, which is adapted to entirely perform the object of the invention hereinbefore stated—that is to say, removing a baked article from the pan, a part of such function being accomplished by the relative movement of the pan members and completed by a knife blade revolubly connected to the pan by means of the pin which pivotally connects the pan members to each other.

The manner of connecting together the two members of the pan by means of a centrally located pivot and the interengaging peripheral tongue-and-groove devices are important features of the invention causing the members of the pan body to be held in juxtaposition with each other and permitting practically one-half of an article within the pan being readily exposed—or protruded from the pan for easy removal.

What I claim is,—

1. In a pan, means for removing pastry therefrom, said means comprising, in combination, a substantially semi-circular pan member having disposed centrally of the circumference thereof, a pin, a cooperating semi-circular pan member arranged below said first named member and engageable by said pin for rotary movement below said first named member, and a blade arranged above said first named member and having its inner end engageable by said pin for rotary movement above said first named member, said blade having at the outer portion thereof lever means for clamping said blade against the flanged circumferential portions of said pan members.

2. A circular pan comprising two complementary members having their meeting edges in continuously overlapping relation, and a pivot located centrally of the pan, said pivot connecting the two members together for rotary movement about the axis thereof.

3. A circular pan comprising two complementary members connected with each other at the pan rim for rotary movement about the center of the pan as the axis.

Signed at Seattle, Washington, this 19th day of April, 1928.

ALMA DILLOW.